United States Patent

Cohen et al.

[15] 3,678,205

[45] July 18, 1972

[54] MODULAR SWITCHING NETWORK

[72] Inventors: Gerald Cohen; Maurice I. Crystal, both of Brookline, Mass.

[22] Filed: Jan. 4, 1971

[21] Appl. No.: 103,494

[52] U.S. Cl. ..................179/15 AQ, 179/18 AG, 340/147 C, 340/166 R

[51] Int. Cl. ..........................................H04q 3/60, H04j 3/16

[58] Field of Search ..............179/15 AQ, 18 AG; 340/147 C, 340/166 R

[56] References Cited

UNITED STATES PATENTS 3,567,865 3/1971 Chu..................................179/18 AG
3,573,381 4/1971 Marcus .............................179/15 AQ
3,281,537 10/1966 Dupieux et al....................179/15 AQ

*Primary Examiner*—Donald J. Yusko
*Attorney*—Norman J. O'Malley, Elmer J. Nealon and Robert T. Orner

[57] ABSTRACT

A switching network employs a plurality of input trunk groups each having a predetermined number of input channels associated therewith. Each of a plurality of switching modules, the number of which corresponds to the number of incoming trunk groups, has a separate input connection from each of the plurality of input trunk groups and an output connection coupled to a different one of a plurality of output trunk groups. Incoming information on a single channel of any input trunk group is directed to all switching modules and switched by the particular module associated with the output trunk group over which the information is to pass.

8 Claims, 2 Drawing Figures

Patented July 18, 1972 3,678,205

2 Sheets-Sheet 1

INVENTORS
Maurice I. Crystal
Gerald Cohen
By Robert T. Orner
Attorney

INVENTORS

Maurice I. Crystal

Gerald Cohen

By Robert T. Orner

Attorney

MODULAR SWITCHING NETWORK

BACKGROUND OF THE INVENTION

This invention relates to switching systems and in particular to telephone switching systems employing time division multiplexing (TDM).

In present TDM switching systems, each incoming trunk group to a communication center is connected to a preassigned switching module which is specifically identified with that trunk group. Each trunk group has a predetermined number of channels, for example 64, associated therewith. In a switching system in which a separate switch module is provided for each trunk group, the network channel capacity at a switching center can be expanded only by increasing the logic circuit speed of the switching module. When the upper speed limit of the circuit elements is reached, further expansion of channel capacity requires a more complicated interconnection network topology.

It would therefore be advantageous to have, and it is one of the objects of this invention to provide, a switching network in which the channel capacity can be increased while the logic circuit speed remains constant.

SUMMARY OF THE INVENTION

A switching system according to the present invention employs a plurality of input trunk groups, each group including a number of information channels. Each of a plurality of switching modules has a different input connection coupled to each of the plurality of input trunk groups and an output connection coupled to a different one of a plurality of output trunk groups, each of which also includes a number of data channels. The plurality of switching modules are operative to transfer data from any one of the input information channels to any one of the output information channels of the associated output trunk group.

BRIEF DESCRIPTION OF THE DRAWINGS

The construction and operation of the modular switching system according to the invention will be more fully understood from the following detailed description taken in conjunction with the accompanying drawings in which.

DETAILED DESCRIPTION OF THE INVENTION

Figure 1:
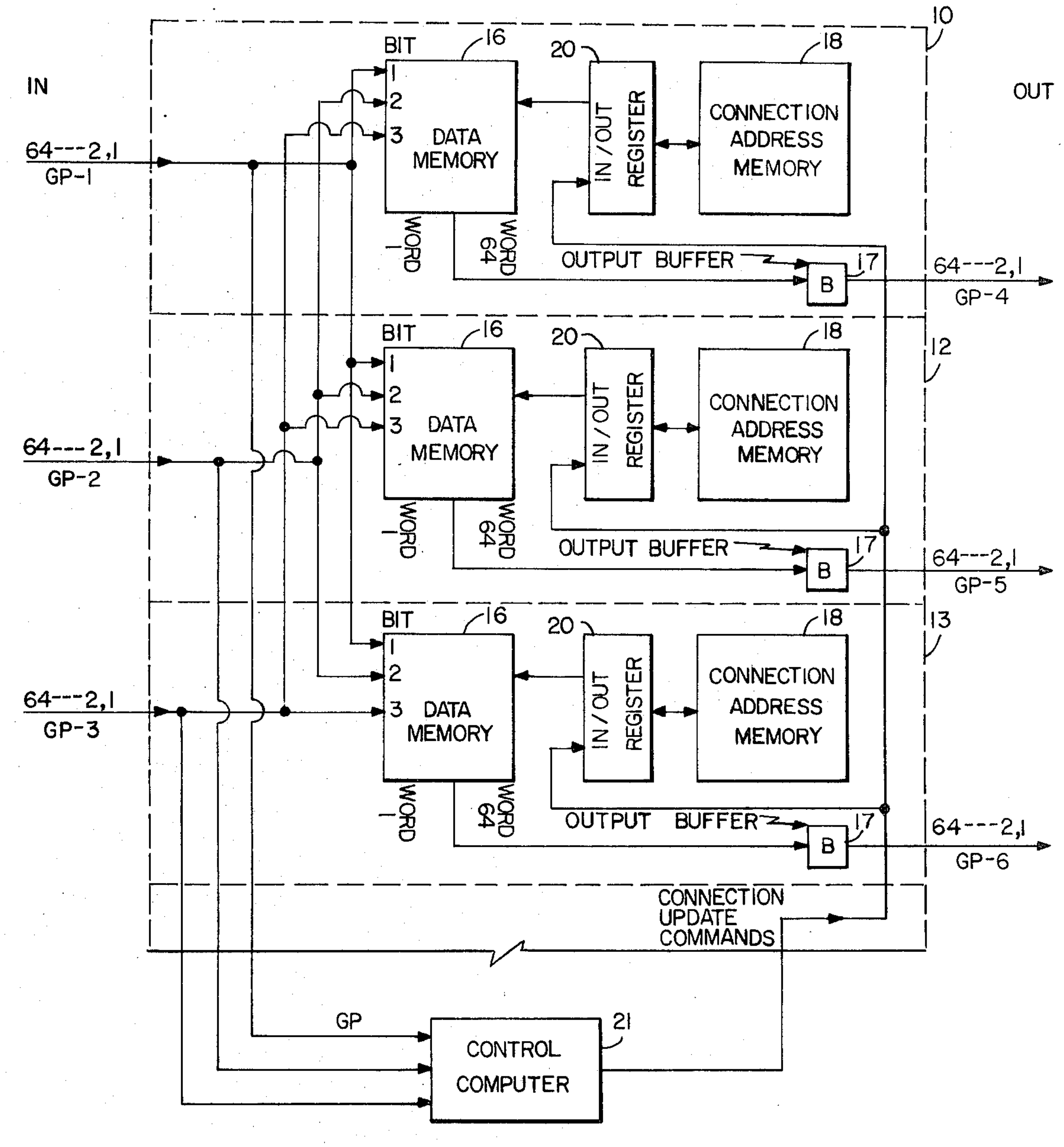
FIG. 1 is a block diagram of an embodiment of a switching system according to the invention.

An embodiment of a TDM telephone switching system according to the present invention is shown in FIG. 1 and includes a plurality of incoming trunk groups, GP–1, GP–2 and GP–3 (three of which are used for illustration purposes), each including 64 TDM channels. The number of channels and the number of incoming trunk groups may vary. Each of a like plurality of switching units 10, 12 and 13 have a separate input connection coupled to each of the incoming trunk groups GP–1, GP–2 and GP–3 and an output connection coupled to a different one of a plurality of outgoing trunk groups GP–4, GP–5 and GP–6. Included in each switching unit is a data memory system 16, the input connection of which is coupled to each incoming trunk group and the output connection of which is coupled to an output buffer 17. Also included in each switching unit is a connection address memory system 18 having an input/output register 20 associated therewith. The output connection of the input/output register 20 is coupled to the data memory system 16 and the input connection is coupled to a control computer 21, the input connections of which are coupled to the incoming trunk groups GP–1, GP–2 and GP–3.

The incoming channel groups GP–1, GP–2 and GP–3 are transmission lines adapted to propagate data time division multiplexed by bits, each 64 channel frame contains 64-bit periods (time slots). For example, the bit period is 407 nanoseconds for a 38.4 kilobit per channel rate and 814 nanoseconds for a 192 kilobit per channel rate. The channels are switched by time slot interchange. The control computer 21 senses and decodes a dial address from a subscriber on a channel of an incoming trunk group. The decoded dial address results in a connection update command from the control computer 21 to the appropriate connection address memory system of the particular output trunk group over which a message is to travel. For example, to connect channel 2 of incoming trunk group GP–1 to channel 3 of outgoing trunk group GP–5, the switching module 12 accepts and stores the binary data that appears in the second time slot of each frame of incoming group GP–1 and transmits it under the control of the control computer 21 during the third time slot (channel 3) of each frame of outgoing trunk GP–5.

To implement time slot interchange, three operations are performed in a switching module during each bit period "-write-in," "read address" and "read out." Each operation requires that the data or connection address memory units be accessed. During the "write-in" portion of a bit period, binary data appearing at each incoming channel is transferred into the data memory system 16 of each switching unit 10, 12 and 13. All incoming bits are transferred, simultaneously, into preset locations in all of the data memories 16. The incoming bits are stored in data words associated with the bit periods and in bit positions associated with channel groups, as will be explained in more detail hereinafter.

During the "read address" portion of the bit period, the address of the bit which must be transferred out of the data memory 16 is read out of the connection memory 18 into the associated input/output register 20. Address information is stored in the connection address memory 18 in word locations associated with the bit periods. In effect, the connection address memories 18 contain connection commands from the control computer 21. The function of a control computer to control a switching matrix is well-known. See, for example, the Bell System Technical Journal, Volume XLII, Sept. 1964, pages 1961 through 2019. Connection memory commands can be changed during the "write-in" or "read out" portions of the bit period to update connection commands for new calls as determined by the control computer.

During the "read out" portion of the bit period, the addressed data bits are transferred out of the data memories 16 to the appropriate channel of the outgoing trunks via the appropriate output buffer.

Figure 2:
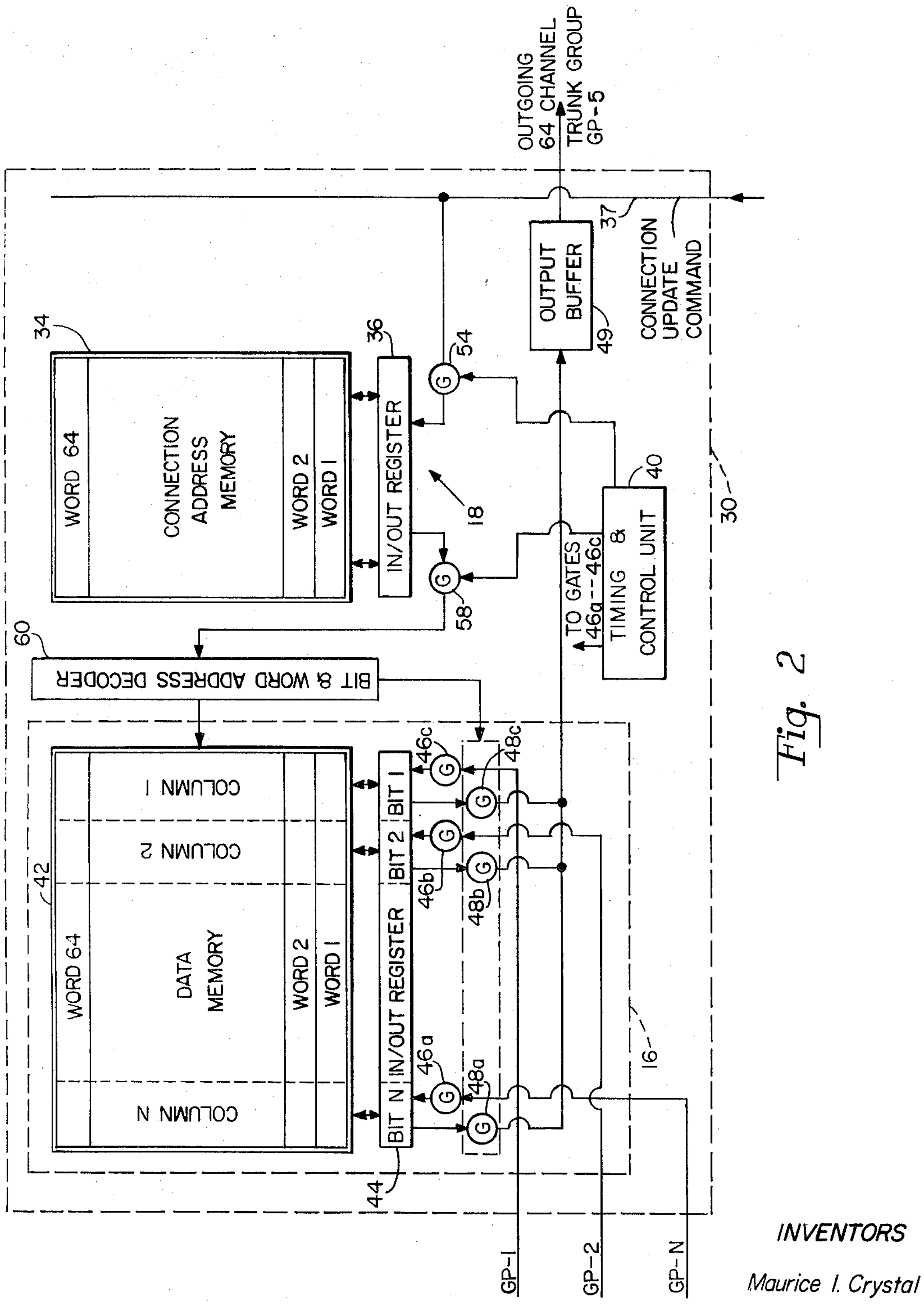
FIG. 2 is a more detailed block diagram of a switching module employed in the embodiment of FIG. 1.

A detailed block diagram of an embodiment of a modular switching unit 30 is shown in FIG. 2 and includes a data memory system 16 including a data memory 42 coupled to each incoming trunk group via an input/output register 44 and a first plurality of transfer gates **46*a*–46*c*. Also included in the switching module 30 is connection memory 34 having input/output register 36 associated therewith. Connected between the input connection of the input/output register 36 and a line 37 from the control computer is an input gate 54**.

The output connection of the input/output register 36 is coupled via an output gate 58 to a bit and word address decoder 60 having one output connection coupled to the data memory 42 and another output connection coupled to each of a plurality of gates **48*a*–48*c*. The design of the bit and word address decoder 60 is within the purview of one skilled in the art. For example, see the book entitled "Digital Computer Design Fundamentals" by Yaohan Chu, McGraw-Hill Book Company, Inc., beginning at page 396. A timing and control unit 40 furnishes the appropriate timing signals to the gates 54, 58 and 46*a*–46*c***.

The modular data memory 42, for illustration purposes, is designed such that data in the vertical columns corresponds to the trunk groups GP–1 through GP–N and the data in the horizontal rows corresponds to the channels 1 through 64. For example, the data stored in column 1 corresponds to the information bits in trunk group GP–1, in column 2 to the bits in trunk group GP–2, etc.; the data in word 1 corresponds to the information bits in channel 1, the word 2 to bits in channel 2, etc.

During the "write-in" operation, the gates 46a–46c are opened by a signal from the timing and control unit 40 and the incoming data from the trunk groups is written via the input/output register 44 into a predetermined position in the data memory 42. During the "read address" operation, the data representing the connection command is read out of the connection address memory 34 and into the associated input/output register 36. During the "read out" operation, the connection address stored in the input/output register is transferred to the bit and word decoder 60 via the output gate 58.

The word address information from the decoder 60 causes a specific word (data received from a particular channel of all the incoming trunk groups) to be transferred into the input/output register 44 from the data memory 42. The bit address information from the decoder 60 causes one of the gates 48a–48 to open so that the selected bit of the appropriate word is directed via the output buffer 49 to the appropriate channel of the appropriate outgoing trunk group.

For example, if the data arriving in channel 2 of incoming trunk GP–1 is to be transferred to channel 1 of outgoing trunk group GP–5, one bit of the data from channel 2 of incoming trunk group 1 is written into the address designated as column 1, word 2 via the input/output register 44. During the "read address" operation, the data constituting the connection command is read out of the connection address 34 to the input/output register 36. (The particular connection address can be permanently stored in the connection address memory or, as shown in FIG. 2, can be initiated at the control computer 21 as a connection update command and directed to the connection address memory 34 prior to the read address operation.)

During the "read out" operation, the connection address is transferred to the bit and word address decoder 60 and decoded therein. The word portion of the connection address transfers the data bits from the word 2 storage area (corresponding to channel 2) of the data memory 42 into the input/output register 44, and the bit portion of the connection address opens the gate 48c (the output gate associated with incoming trunk group GP–1) to transfer the stored bit to the outgoing trunk group via the output buffer 49. This completes the transfer for one bit of information and three steps (write-in, read address and read out) are repeated for each bit.

While there has been shown and described what is considered a preferred embodiment of the present invention, various modifications may be made therein without departing from the invention as defined by the appended claims.

what is claimed is:

1. A communication switching system comprising:
   - a plurality of input trunk groups, each including a number of information channels;
   - a plurality of output trunk groups, each including a number of information channels;
   - a plurality of switching modules, each having a plurality of input connections, the number of input connections in said plurality of input connections of each of said switching modules being equal in number to the number of input trunk groups in said plurality of input trunk groups, each input connection of each switching module being coupled to a separate one of said plurality of input trunk groups, each switching module having an output connection coupled to a different one of said plurality of output trunk groups, and each of said plurality of switching modules being operative to transfer data from any one of the information channels of said plurality of input trunk groups to any one of the information channels of the associated different one of said plurality of output trunk groups.

2. A communication switching system according to claim 1 wherein each of said plurality of input and output trunk groups includes a transmission line adapted to propagate time division multiplexed data having a predetermined number of time slots each of which corresponds to one of said information channels.

3. A communication switching system according to claim 2 wherein each of said plurality of switching modules includes a control line.

4. A communication switching system according to claim 3 including control means having an input connection coupled to each of said plurality of input trunk groups and an output connection coupled to the control line of each of said plurality of switching modules and being operative in response to data on said plurality of input trunk groups to direct a control signal to the control line of a selected one of said switching modules to transfer the incoming data to an information channel of the selected output trunk group.

5. A communication switching system according to claim 1 wherein each of said plurality of switching modules includes
   - data memory means having input connections coupled to each of said plurality of input trunk groups, an output connection coupled to a predetermined one of said output trunk groups and an address connection and being operative to store information bits arriving on said trunk groups in predetermined memory locations and being operative in response to a connection address signal at its address connection to exit selected ones of said information bits to its associated output trunk group; and
   - connection address memory means coupled to the address connection of said data memory means and being operative to store a predetermined number of connection address signals corresponding to the number of information channels and to transfer said connection address signals to said data memory means whereby the data stored in said data memory means is transferred to selected information channels of said associated output trunk group.

6. A time division communication switching system comprising:
   - a plurality of input trunk groups, each including a number of information channels;
   - a plurality of output trunk groups, each including a number of information channels;
   - a plurality of data memory means, each having input connections coupled to each of said plurality of input trunk groups, each having an output connection coupled to a different one of said plurality of output trunk groups and each having a connection address input connection and each being operative to store in predetermined locations data arriving on the information channels of said plurality of input trunk groups and to transfer said data to a selected information channel of its associated output trunk group in response to a connection address signal at its connection address input connection; and
   - a like plurality of connection address memory means, each being coupled to a different one of said plurality of data memory means and being operative to store a number of connection address signals corresponding to the number of information channels on said output trunk groups and being operative to store and sequentially transfer said connection address signals to the connection address input connection of its associated data memory whereby the data stored in the associated memory is sequentially transferred to its associated output trunk group in an order corresponding to the connection address signals.

7. A time division communication switching system according to claim 6 wherein
   - each of said plurality of connection address memory means includes an input address connection and is operative in response to a signal at its input address connection to update any connection address signal stored therein.

8. A time division communication switching system according to claim 7 including a computer control means having input connections coupled to each of said plurality of input trunk groups and output connections coupled to each of the input address connections of said plurality of connection address memory means and being operative in response to data arriving on any one of the information channels of said plurality of input trunk groups to generate a connection update signal at the input address connection of a selected one of said connection address memory means to have the connection address signal stored in said selected one of said connection address memory means whereby the data arriving on any one of the information channels of said plurality of input trunk groups can be transferred to any one of the information channels of the output trunk group associated with said selected one of said connection address memory means.

* * * * *